US010826708B2

(12) United States Patent
Campagna

(10) Patent No.: US 10,826,708 B2
(45) Date of Patent: *Nov. 3, 2020

(54) AUTHENTICATING NONCES PRIOR TO ENCRYPTING AND DECRYPTING CRYPTOGRAPHIC KEYS

(71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/798,117

(22) Filed: Oct. 30, 2017

(65) Prior Publication Data

US 2018/0054309 A1    Feb. 22, 2018

Related U.S. Application Data

(63) Continuation of application No. 14/494,455, filed on Sep. 23, 2014, now Pat. No. 9,806,887.

(51) Int. Cl.
*H04L 9/32* (2006.01)
*H04L 9/08* (2006.01)
*H04L 9/06* (2006.01)

(52) U.S. Cl.
CPC .......... *H04L 9/3242* (2013.01); *H04L 9/0822* (2013.01); *H04L 9/0637* (2013.01); *H04L 9/3234* (2013.01); *H04L 9/3271* (2013.01)

(58) Field of Classification Search
None
See application file for complete search history.

(56) References Cited

U.S. PATENT DOCUMENTS

| 2002/0051537 | A1 | 5/2002 | Rogaway | |
| 2004/0003246 | A1* | 1/2004 | Hopkins | H04L 9/0625 713/168 |
| 2004/0017913 | A1 | 1/2004 | Hawkes et al. | |
| 2006/0206710 | A1* | 9/2006 | Gehrmann | H04L 9/0841 713/168 |
| 2007/0100701 | A1* | 5/2007 | Boccon-Gibod | H04L 9/3247 705/21 |

(Continued)

OTHER PUBLICATIONS

Burrows et al., "Security Requirements for Cryptographic Modules," U.S. Department of Commerce National Institute of Standards and Technology (NIST) Federal Information Processing Standards (FIPS) Publication 140-1, Jan. 11, 1994, 56 pages.

(Continued)

*Primary Examiner* — Benjamin E Lanier
(74) *Attorney, Agent, or Firm* — Davis Wright Tremaine LLP

(57) ABSTRACT

Data security is enhanced by receiving a request that identifies an encrypted data key, an authentication tag, and additional authenticated data that includes at least a nonce. In some cases, the authentication tag is cryptographically derivable from the encrypted data key and the additional authenticated data. A system, in some cases, determines whether the nonce is authentic and decrypts the encrypted data key by using at least a cryptographic key and the nonce, thereby resulting in a plaintext data key that is usable in various contexts.

20 Claims, 8 Drawing Sheets

(56) References Cited

U.S. PATENT DOCUMENTS

| | | | |
|---|---|---|---|
| 2008/0044014 A1* | 2/2008 | Corndorf | H04L 63/12 380/37 |
| 2008/0130875 A1* | 6/2008 | Ahlquist | G06F 21/72 380/29 |
| 2008/0141020 A1 | 6/2008 | VanHeyningen | |
| 2009/0089593 A1* | 4/2009 | Kuno | G06F 21/445 713/193 |
| 2010/0027783 A1* | 2/2010 | Yup | H04L 9/0631 380/44 |
| 2010/0098255 A1* | 4/2010 | Ciet | H04L 9/0838 380/277 |
| 2012/0096266 A1 | 4/2012 | Fukuda | |
| 2013/0080769 A1 | 3/2013 | Cha et al. | |
| 2013/0086662 A1 | 4/2013 | Roth et al. | |
| 2014/0177823 A1* | 6/2014 | Gopal | G06F 21/00 380/28 |
| 2014/0229737 A1* | 8/2014 | Roth | H04L 9/0618 713/176 |
| 2015/0295713 A1 | 10/2015 | Oxford | |

OTHER PUBLICATIONS

Housley, "Using Advanced Encryption Standard (AES) Counter Mode With IPsec Encapsulating Security Payload (ESP)," Request for Comments: 3686, Standards Track, Jan. 2004, 19 pages.

Mehuron et al., "Security Requirements for Cryptographic Modules," U.S. Department of Commerce National Institute of Standards and Technology (NIST) Federal Information Processing Standards (FIPS) Publication 140-2, May 25, 2001, 69 pages.

* cited by examiner

AUTHENTICATING NONCES PRIOR TO ENCRYPTING AND DECRYPTING CRYPTOGRAPHIC KEYS

CROSS-REFERENCE TO RELATED APPLICATION

This application is a continuation of U.S. patent application Ser. No. 14/494,455, filed Sep. 23, 2014, now U.S. Pat. No. 9,806,887, entitled "AUTHENTICATING NONCES PRIOR TO ENCRYPTING AND DECRYPTING CRYPTOGRAPHIC KEYS," the disclosure of which is hereby incorporated herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). Many encryption algorithms rely on the use of a cryptographic nonce, a number or bits of information that are to be only used once in the context of an encryption, and may be necessary to properly perform decryption. Conventional encryption systems may impose constraints on the use of nonces, such as the nonce's uniqueness or that the same cryptographic key and nonce must be used in both encryption and decryption. Generally, it is desirable to enforce these constraints to prevent the weakening of the encryption system or to enforce the proper usage of nonces.

BRIEF DESCRIPTION OF THE DRAWINGS

Various embodiments in accordance with the present disclosure will be described with reference to the drawings, in which.

DETAILED DESCRIPTION

Figure 1:
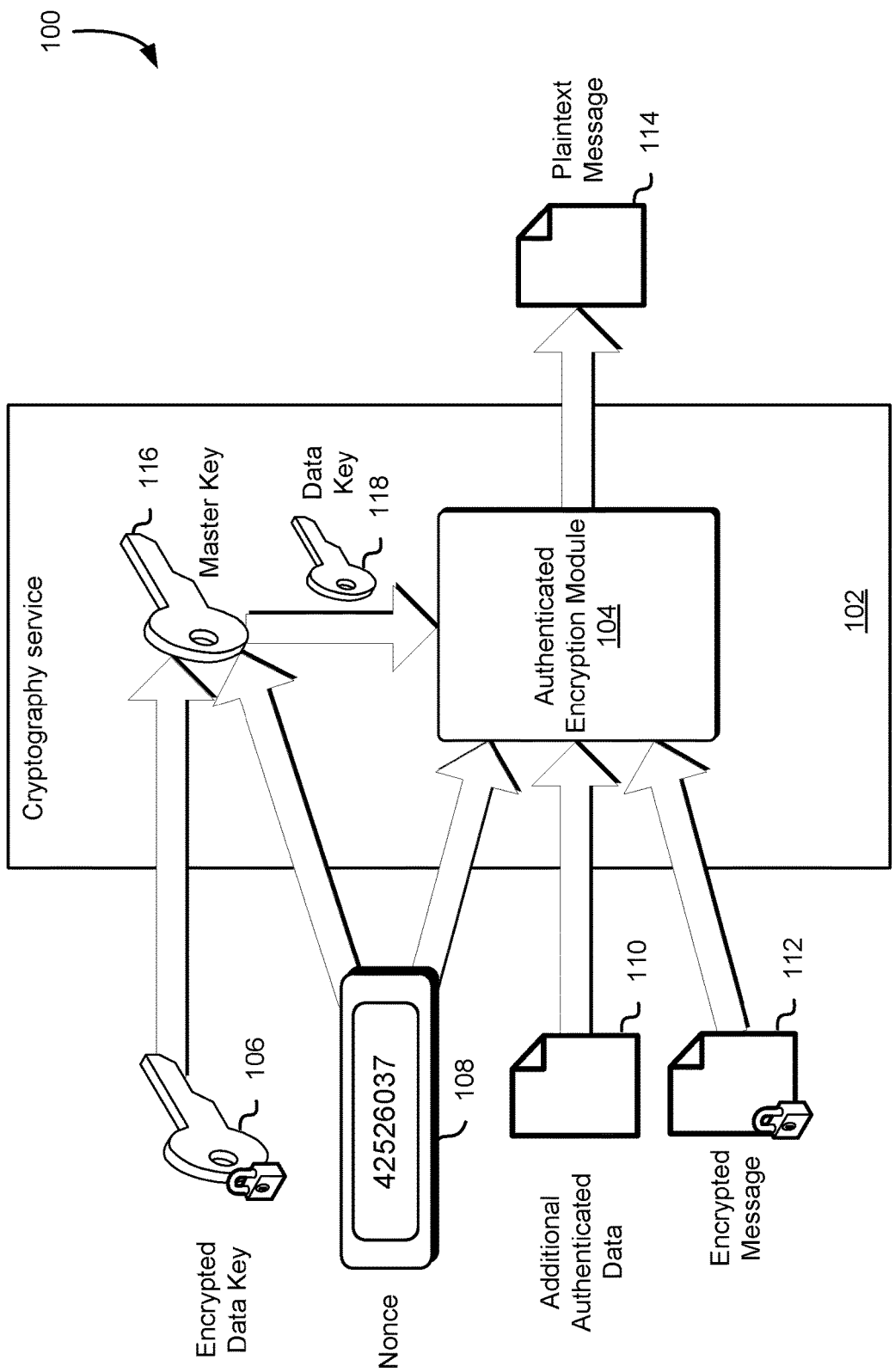
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide for improved operation of computer systems that perform or otherwise utilize cryptographic authorizations by authenticating nonces prior to decrypting an encrypted data file. In an embodiment, a service provider provides an application programming interface (API) callable by customers of the service provider to utilize services of the service provider. In some examples, a customer of the service provider may have an encrypted data key that the customer may submit an API call for decrypting the data key. The service provider may make an authentication check to ensure that the correct nonce is provided to the API call to decrypt the encrypted data key. The authenticated nonce and data key may then be used to decrypt an encrypted data file Note that, while a service provider and customer relationship is used for the purpose of illustration of a context where the technical advantages are particularly significant, the techniques described herein are applicable to other contexts where cryptographic operations are performed.

In some examples, a service provider uses an authenticated encryption mode of a cipher, such as the Galois counter mode or the counter with cipher block chaining message authentication code mode of the advanced encryption standard (AES-GCM and AES-CBC, respectively). To provide an efficient mechanism for nonce authentication, in some embodiments, the service provider utilizes additional authenticated data (AAD) of a mode of a cipher used for encryption. In some examples, the nonce or other information based at least in part on the nonce is input into the encryption algorithm as AAD and used to encrypt a data key, and the same nonce and data key are used to encrypt a data file. As a result, ciphertext produced by the encryption includes an authentication tag (e.g., a message authentication code (MAC)) usable to verify authenticity and integrity of the AAD. Encrypted data may comprise a ciphertext and an authentication tag. When the encrypted data key is presented for decryption, a nonce is also provided and authenticated. Authentication of the nonce provides assurances that the unencrypted data key and nonce are usable to successfully perform a decryption on an encrypted data file (i.e., to obtain a copy of the data file that was input into an encryption algorithm to obtain the encrypted data file). As a result, the techniques herein provide for assurances that nonces are bound to a cryptographic key, thereby enhancing data security by enabling the avoidance of insecure nonce usage that reduce the difficulty of various cryptographic attacks (such as attacks using cryptanalysis). Further bindings may also be made, such as a binding between the encrypted data key to another cryptographic key by including the encrypted data key in the AAD.

FIG. 1 illustrates an environment 100 in which various embodiments may be practiced. The encryption environment 100 includes a cryptography service 102 that includes an authenticated encryption module 104 that accepts at least an encrypted data key 106, a nonce 108, additional authenticated data 110 including at least the nonce, and a message 112 to decrypt 112. The authenticated encryption module may provide a ciphertext message 114 and a message authentication code 116 in response to the encrypted data key, nonce, additional authenticated data, and plaintext message to encrypt. The same nonce provided to the authenticated encryption module is also included in the additional authenticated data.

The authenticated encryption module 104 may be a program module with programming logic for performing operations in accordance with authenticated encryption modes of one or more ciphers and/or other operations, such as described herein. In some embodiments, the authenticated encryption module 104 is implemented by a security module, such as a hardware security module (HSM). In some embodiments, the authenticated encryption module 104 is not a component included in the cryptography service, but rather is an external component (e.g., not physically attached) accessible by the cryptography service 102. In some embodiments, the authenticated encryption module 104 accepts at least the encrypted cryptographic key, nonce, additional authenticated data, and plaintext message. In some embodiments, the authenticated encryption module requires at least these inputs to perform encryption although some inputs, such as a plaintext message, may be generated by the authenticated encryption module or otherwise inside of the cryptography service 102. Furthermore, in this embodiment, the additional authenticated data also includes at least the nonce provided to the authenticated encryption module. The authenticated encryption module may be accessible to clients of the cryptography service, and may be used to encrypt a plaintext messages, add an additional layer of encryption over an already encrypted message and/or ensure the authenticity and/or integrity of the message. The authenticated encryption module may be accessed by any suitable software method, for example, as an API call which may be in the form of a hypertext transfer protocol (HTTP) request, a remote procedure call (RPC), and so forth. In some embodiments, a cryptographic object containing at least the key, nonce, additional authenticated data, and plaintext message may be provided to the authentication encryption module instead of, or in addition to, the components comprising the cryptographic object.

In the embodiment shown in FIG. 1, the cryptography service is operable to decrypt the encrypted message. The cryptography service may authenticate the provided nonce 108 in the decryption of the encrypted data key 106, the decryption of the encrypted data key using at least a master key 116 and the provided nonce 108. In some embodiments, the cryptography service itself may have access to the master key, for example, where the master key is stored locally in memory accessible to the cryptography service or where the master key is persisted in an attached hardware security module (HSM) accessible to the cryptography service. In other embodiments, the master key may not be accessible directly by the cryptography service (e.g., the master key is not stored or accessible strictly by the hardware and software components that comprise the cryptography service), but accessible via another component. For example, the cryptography service may have a secure connection (e.g., a Secure Socket Layer (SSL) connection and/or a virtual private network (VPN) connection) to access a hardware security module located on a remote server. The cryptography service may need to be authenticated as a trusted component through a process such as code-signing. The master key, in some embodiments, is managed by the cryptography service on behalf of a customer of a plurality of customers of a service provider. The master key may be one of many cryptographic keys managed by the cryptography service on behalf of its customers. Accordingly, the cryptography service may have additional components, such as a database, for tracking associations between cryptographic keys and their respective entities.

In the embodiment shown in FIG. 1, the encrypted data key and nonce are provided to the cryptography service and may be used to authenticate the nonce for use in decrypting the encrypted message 112. In some embodiments, a decryption operation may be performed on the encrypted data key 106 using the master key, the nonce, and additional authenticated data (AAD) including at least the nonce. Upon authenticating the nonce is authentic, an unencrypted data key 118 is provided to the authenticated encryption module 104 for use in decrypting the encrypted message 112.

The nonce 108, in an embodiment, is an arbitrary number, such as a random or pseudo-random number, or may be deterministically selected, for example, a timestamp or counter. In some embodiments, the nonce may be used to generate an initialization vector (IV). The initialization vector may be random/pseudorandom or may be stateful (e.g., a counter mode of operation), and may be non-repeating. The initialization vector may be used to operate a stream cipher in modes of operation which are capable of securely encrypting data that is larger the block size. For some cryptographic algorithms, the terms nonce and IV are interchangeable. In an embodiment, the nonce 108 value was used to encrypt both the encrypted data key 106 and the encrypted message 112.

In various embodiments, the additional authenticated data (AAD) includes at least the same nonce provided to the authenticated encryption module. In other embodiments, the AAD may include the result of a hashing function or cryptographic hash function that uses the nonce as an input. The plaintext message is the message that is to be encrypted, and may already be encrypted (i.e., the plaintext message is not necessarily unencrypted). The additional authenticated data may be necessary to determine the authenticity of the received message. Note that, while the present disclosure uses AAD comprising a nonce for the purpose of illustration, AAD may be otherwise based at least in part on a nonce. For instance, instead of comprising the nonce itself, the AAD may include a result of a transformation of the nonce, such as output of a cryptographic hash function applied to the nonce and verification may take into account the transformation, such as by performing the same transformation as part of validation of the AAD. Generally, any way by which the AAD can be used to verify the authenticity of the nonce may be used. In some embodiments, the AAD includes additional data to be authenticated. For instance, the AAD may contain or otherwise be based at least in part on an encrypted data key.

The authenticated encryption module, in an embodiment, accepts the encrypted data key, nonce, additional authenticated data, and makes available a plaintext message 114. In some embodiments, this client may be the same client that called the authenticated encryption module or may be another client.

The encrypted message may be generated by using the unencrypted data key 118 as a cryptographic key in a symmetric cryptographic algorithm (or, generally, any cryptographic algorithm that utilizes a nonce as input), and may be decrypted using the unencrypted data key. In some embodiments, a client may have the data key. In some embodiments, client may not have the data key, but may request the data key from the cryptography service. In other embodiments, the client does not have the key and may request the cryptography service to perform the decryption by providing an encrypted data key.

An authentication tag may be one or more strings of data associated to a message that provides assurances of the message's integrity and authenticity, wherein integrity refers to the message being unchanged from its original content (e.g., determining whether the message has been accidentally modified or deliberately tampered with) and authenticity refers to establishing the message's origin. In some embodiments, the authentication tag may be associated to a plaintext or ciphertext message.

The message authentication code (MAC) is produced by a MAC algorithm such as a keyed hash function. In an embodiment, the MAC algorithm accepts the data key, ciphertext, and nonce as inputs into a keyed hash function and produces a value that may be used to authenticate the encrypted message's authenticity. In some embodiments, the nonce may instead be appended to the MAC. In other embodiments, the plaintext may be used instead of the ciphertext. A MAC may be a type of authorization tag.

While FIG. 1 shows an encrypted message (encrypted under the data key 118) being provided to the cryptography service for the purpose of illustration, the cryptography service 102 may be used in other ways in accordance with various embodiments. For example, in some embodiments, a client of the cryptography service (e.g., a client associated with a customer of a service provider that provides the cryptography service) may request an encrypted data key and fulfillment of the request by the cryptography service ma include encrypting the data key using the authenticated encryption module and providing the encrypted data key in response. In some embodiments, the client provides the data key and in other embodiments the cryptography service generates the data key and provides the generated data key (in plaintext form, i.e., a plaintext data key) with the response to the request. The client or another system associated with the client may use the data key to encrypt other data, such as a large file that would be impractical or undesirable to transmit to the cryptography service.

In such embodiments, the cryptography service may generate the encrypted data key by inputting the plaintext data key, the nonce (received from the customer or generated itself or otherwise obtained), and the AAD with the AAD comprising or otherwise based at least in part on the nonce. The cryptography service may provide the encrypted data key and the nonce (along with a MAC) to the client. The client may then use the nonce and the data key to encrypt the data, thereby generating ciphertext. The client may store or otherwise cause to be stored the ciphertext, the nonce, and the encrypted data key in association with one another. For example, the ciphertext, nonce, and encrypted data key may be stored together in a single data object, although variations within the scope of the present disclosure include those where at least two of the ciphertext, nonce, and encrypted data key are stored separately from one another but in association with one another such that all three can be located for decryption of the ciphertext.

In this manner, if/when the client transmits the encrypted data key (along with at least the nonce and AAD) to the cryptography service for decryption, the client may use the returned plaintext data key successfully to decrypt the data because the cryptography service will have failed the request if determined, using the AAD, that the nonce is inauthentic (e.g., because the MAC provided with the encrypted data key and the MAC generated during the decryption process do not match). In other words, successful processing of a decryption request by the cryptography service indicates that the nonce is authentic and, for instance, has not been modified by an error in transmission and/or storage.

Figure 2:
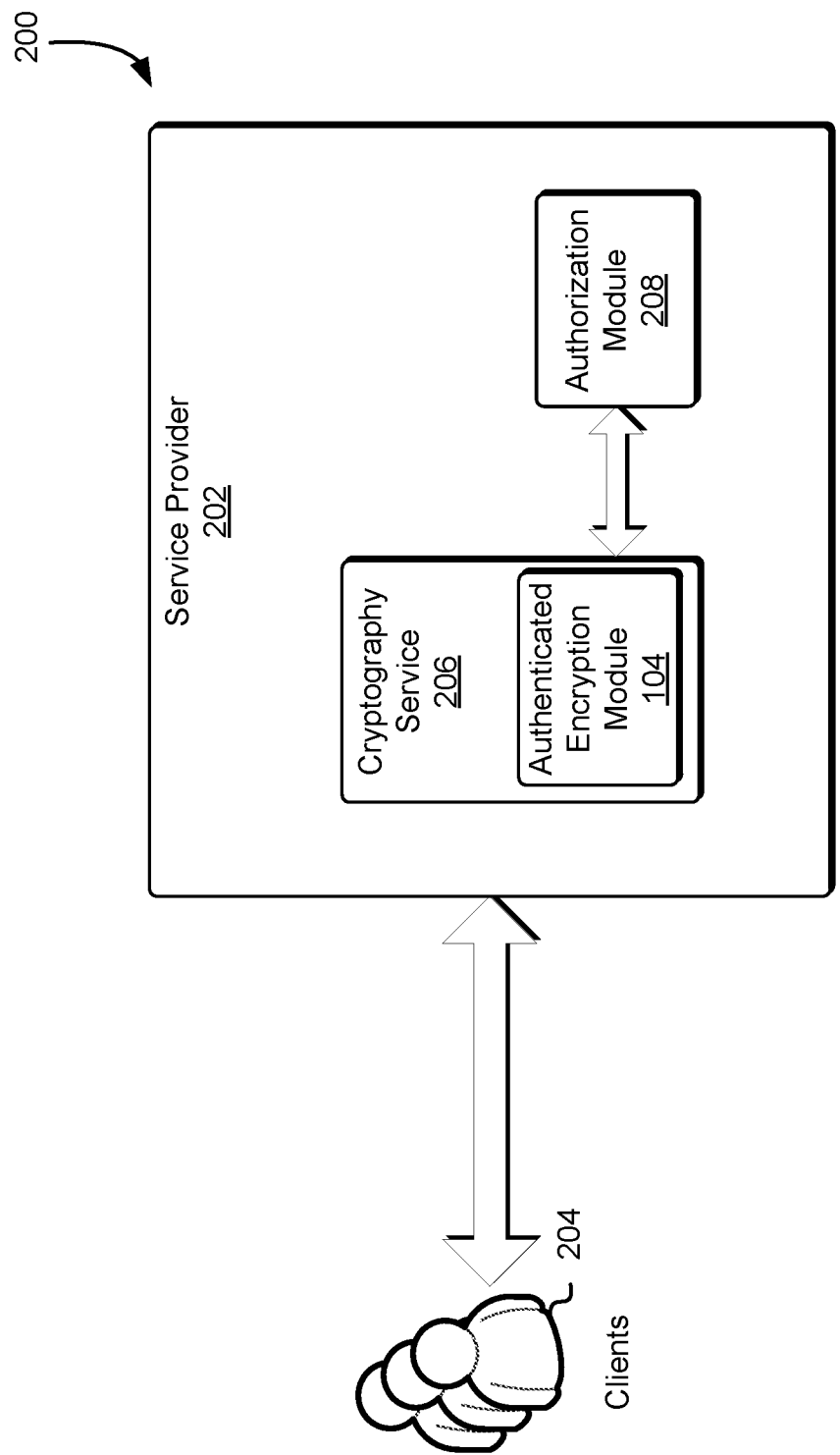
FIG. 2 illustrates an environment in which various embodiments can be implemented.

FIG. 2 shows an illustrative example of an environment 200 which may be used to achieve various technical advantages discussed above. In the environment 200, a service provider 202 has a plurality of customers 204. The customer 204 may communicate with one or more servers of the service provider 202 through an associated client computing device, such as described below. It should be noted that operations being performed by the customer and/or service provider, unless otherwise clear from context, are performed by respective computing devices (e.g., clients or servers) of the entities. The service provider 202 may provide one or more services, such as a cryptography service 206, and may utilize an authorization module 208 as part of providing services. The authorization module may be a computer system, which may be a distributed computer system configured with programming logic to determine whether and/or how to process requests submitted to the service provider 202. The authorization module 208 may, for instance, verify digital signatures of requests submitted to the service provider or otherwise may determine whether fulfillment of requests is authorized. The cryptography service may be one of many computing resource services (e.g., Infrastructure as a Service (IaaS) services and/or Platform as a Service (PaaS) services) operated by the service provider 202. Further, while a customer/provider relationship is discussed throughout the present disclosure for the purpose of illustration, the techniques described herein are adaptable to other contexts, such as when the customer is an internal customer of the service provider 202 (e.g., another service of the service provider 202).

Figure 3:
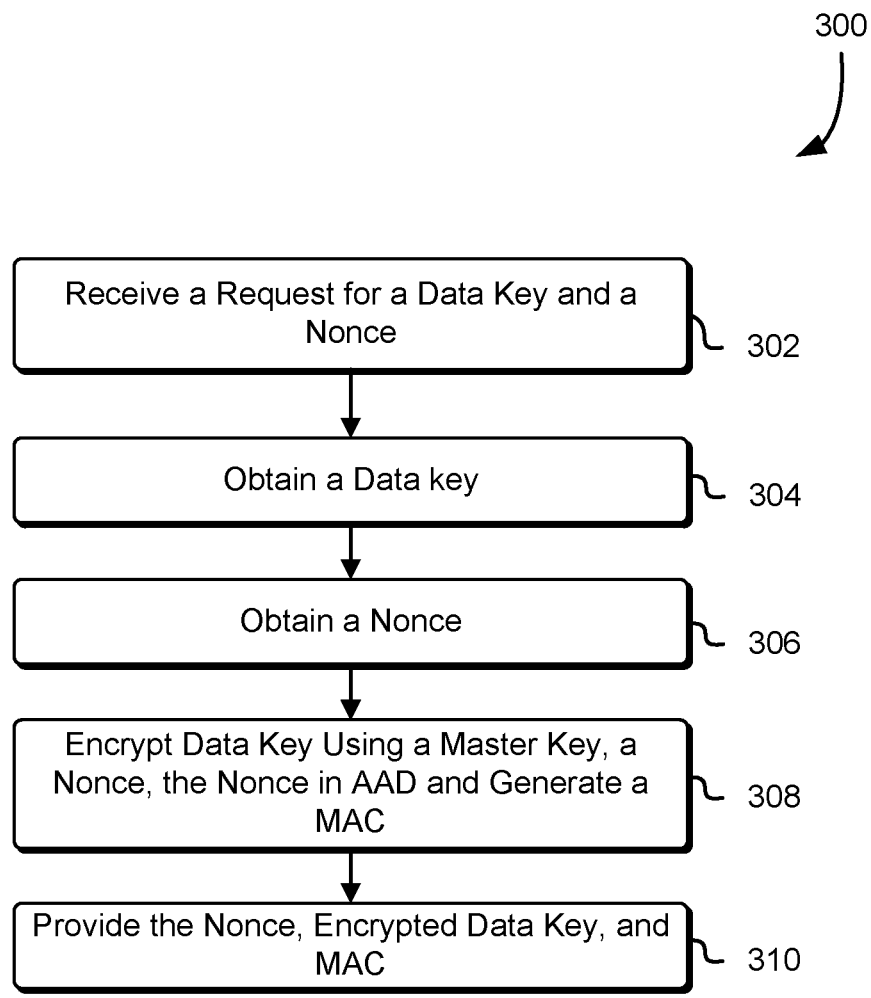
FIG. 3 is an illustrative process for providing a nonce and an encrypted data key capable of being authorized, in accordance with at least one embodiment.

FIG. 3 shows an illustrative example of a process 300 for obtaining a data key and a nonce. In the process 300, the cryptography service may receive 302 a request for a data key and a nonce from a client. The request may, for example, be in the form of an API call. In an embodiment, the cryptography service responds to the request by generating a cryptographic data key and a nonce, encrypts the cryptographic data key, generates a message authentication code, and provides at least the encrypted data key and nonce. The request may be received 302 by a webserver or security module of the cryptography service.

In an embodiment, the cryptography service may obtain 304 the cryptographic data key, such as by generating the key. In other embodiments, a trusted component may generate the cryptographic data key from a request by the cryptography service, or the cryptographic data key may be retrieved from a key repository such as a security module.

In an embodiment, the cryptographic service may obtain 306 a nonce by generating a random or pseudo-random number or otherwise determining the nonce. In some embodiments, the cryptography service may generate the nonce itself, in other embodiments, it may request another component or service to generate the nonce for it. In some embodiments, the nonce may be used to generate an initialization vector (IV) capable of operating a stream cipher in modes of operation that may securely encrypt hundreds of megabytes or gigabytes of data.

The data key is encrypted 308 by an encryption function using at least a symmetric key and a nonce. The cryptographic data key may be encrypted using any of several symmetric key algorithms including AES, DES, 3DES, and so forth. The MAC is a short piece of information used to authenticate the encrypted message and provide integrity and authenticity. The recipient can authenticate whether the encrypted message has been tampered with by generating the MAC against the received encrypted message and checking whether the computed MAC matches the MAC received. If the values do not match, the encrypted message may have been tampered with either, accidentally or deliberately.

In the embodiments shown in FIG. 3, the MAC is generated by running a hashing algorithm over the encrypted data key and nonce. In other embodiments, the MAC is generated by running the hashing algorithm over the encrypted data key and appends the nonce to hashed value. In other embodiments, the MAC is generated by running the hashing algorithm over the unencrypted data key. The MAC may be generated during the course of performance of a cryptographic algorithm, such as AES-GCM or AES-CCM and may be generated by a security module performing the algorithm.

The cryptography service provides 310 at least the nonce, ciphertext version of the data key and the computed MAC value. In some embodiments, these may then be returned to the client synchronously via an API call or may be returned asynchronously, for example, through a callback function. In other examples, the encrypted data key and nonce may be stored in memory or persistent storage and retrievable by the client. In some embodiments, the unencrypted data key is also provided. In some embodiments, a client may receive the unencrypted data key, encrypted data key, and nonce and perform an encryption operation on a plaintext message using the unencrypted data key, the nonce, and optionally an AAD. The encrypted data key and encrypted message may be stored such that they may be retrieved later and decrypted.

Figure 4:
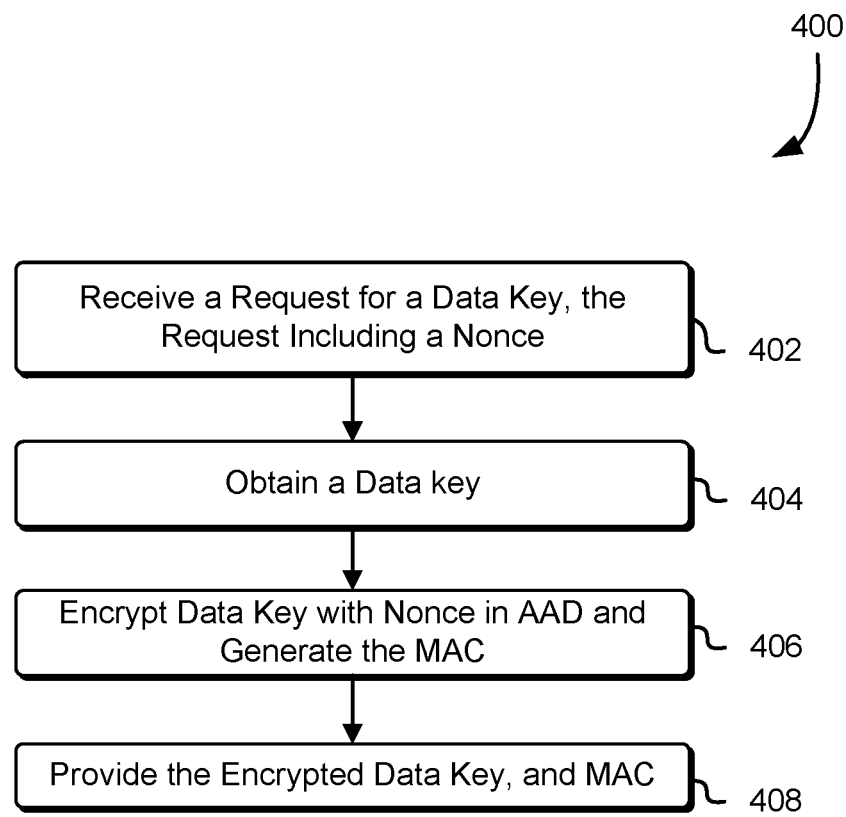
FIG. 4 is an illustrative process for providing an encrypted data key capable of being authorized, in accordance with at least one embodiment.

FIG. 4 describes a process 400 for obtaining a data key. The process 400 may be performed by any suitable system, such as a cryptography service or component thereof, such as a security module. For the purpose of illustration, the process 400 is described as being performed by the cryptography service. The cryptography service may receive 402 a request for a data key, the request including at least a nonce. In some embodiments, the request may be in the form of an API call. In an embodiment, the cryptography service generates a cryptographic data key, encrypts the cryptographic data key using the nonce included in the request, generates a message authentication code, and provides at least the encrypted data key and nonce.

In an embodiment, the API call to obtain 404 a data key includes as an input parameter a nonce, which may be a random or pseudorandom number or another value suitable for use as a nonce. Random or pseudorandom number may be generated in a client wherein the client has a suitable entropy source, or the client may obtain the random or pseudorandom number from another component (e.g., a security module of the cryptography service) with such an entropy source. The nonce may be used as part of the process for obtaining 406 the data key in the manner described in process 300.

The cryptography service provides 408 at least the ciphertext version of the data key and the computed MAC value. In some embodiments, the nonce may also be provided. In some embodiments, these may then be returned to the client synchronously via an API call or may be returned asynchronously, for example, through a callback function (e.g., in response to an additional API call). In other examples, the encrypted data key and nonce may be stored in memory or persistent storage and retrievable by the client. In some embodiments, the unencrypted data key is also provided. In some embodiments, a client may receive the unencrypted data key and encrypted data key and perform an encryption operation on a plaintext message using the unencrypted data key, the nonce that was provided to the cryptography service, and optionally an AAD. The encrypted data key and encrypted message may be stored such that they may be retrieved later and decrypted.

Figure 5:
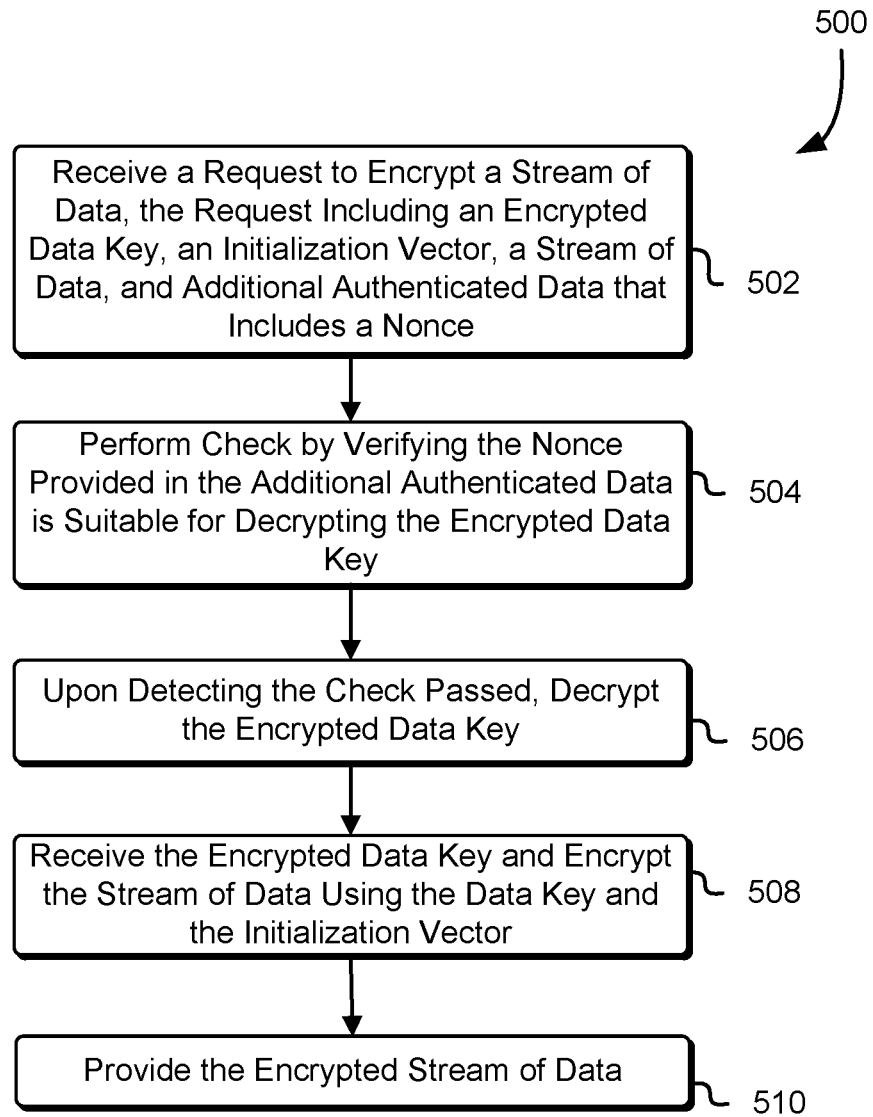
FIG. 5 is an illustrative process for encrypting a stream of data using an encrypted data key capable of being authorized, in accordance with at least one embodiment.

FIG. 5 shows an illustrative example of a process 500 for authenticating a nonce prior to encrypting a stream of data. The process 500 may be performed by any suitable system, such as the cryptography service or a component thereof, such as a security module or a web server together with a security module. For the purpose of illustration, the process 500 is described in connection with a cryptography service. In the process 500, a client may, for example, call an API for encrypting data that a cryptography service (e.g., via a web server) may receive 502. The request may include an encrypted data key, an initialization vector, a stream of data (or at least a portion thereof), and additional authenticated data that includes at least a nonce. The cryptography service may perform 504 a check by verifying authenticity of the additional authenticated data. The check may be performed, for instance, by a security module of the cryptography service using a key specified (e.g., by an identifier) in the request that was received 502 or otherwise specified (e.g., implicitly). Upon detecting 506 that the authorization check passed, the cryptography service (e.g., the security module) may then decrypt the encrypted data key. The cryptography service (e.g., the web server) may then receive 508 the unencrypted data key and encrypt the stream of data using at least the unencrypted data key and the initialization vector. Finally, the cryptography service may then 510 provide an encrypted stream of data to the client, which may be provided after complete encryption or as being encrypted in the case of particularly large amounts of data.

As with all processes described herein, variations of the process 500 are considered as being within the scope of the present disclosure. For instance, as noted above, the process 500 may include the cryptography service receiving 502 a request to encrypt a stream of data, the request including an encrypted data key, an initialization vector, a stream of data, and additional authenticated data that includes at least a nonce. In some embodiments of this disclosure, the initialization vector may not be included in the nonce, and may, for example, be generated from the nonce included in the additional authenticated data. For example, the initialization vector may be generated using the nonce in accordance with RFC 3686 Using Advanced Encryption Standard (AES) Counter Mode With IPSec Encapsulating Security Payload (ESP), which is incorporated herein by reference. In some embodiments, the additional authenticated data may include only the nonce.

Further, while FIG. 5 shows a process for encrypting a stream of data, the process 500 may be adapted for other cryptographic operations, such as decryption. For instance, the process 500 illustrated in FIG. 5 provides a technical advantage in the form of efficiency because, if the check of the nonce fails, computing resources are saved due to the ability to avoid encrypting the stream of data using an invalid nonce. This same advantage can be achieved when the process 500 is adapted for decryption since decryption operations can be avoided when the check of the nonce fails.

In addition, as discussed above, the cryptography service may perform 504 an authorization check by verifying that the nonce provided in the additional authenticated data is capable of decrypting the encrypted data key. In some embodiments, the authorization check may be done without decrypting the encrypted data key. For example, in an embodiment, the cryptography service may use the nonce and ciphertext to compute the MAC using, for example, a cryptographic hash algorithm or another suitable MAC algorithm. The check may then verify the computed MAC matches the provided MAC. If the value of the computed MAC and provided MAC do not match, the check will fail, and the client may be notified of the failure, for example, through returning a failure code to via API. In other embodiments, the encrypted data key may be decrypted as part of the check. In some embodiments, the check is done prior to the encrypting of the stream of data, although the relative ordering of these two steps is not required in accordance to this disclosure.

Figure 6:
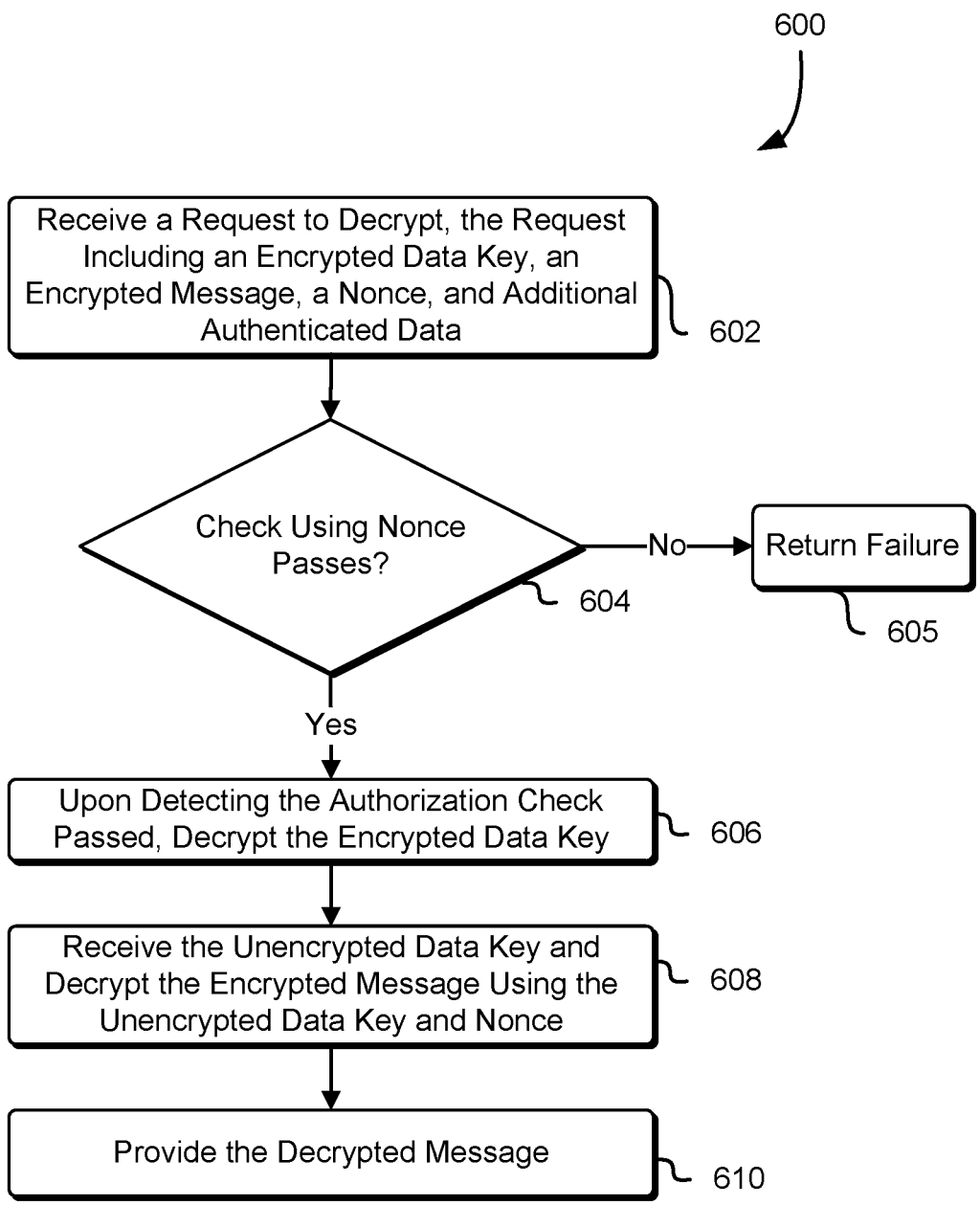
FIG. 6 is an illustrative process for decrypting encrypted data using an encrypted data key capable of being authorized, in accordance with at least one embodiment.

FIG. 6 shows an illustrative example of a process 600 for authenticating a nonce prior to decrypting data. The process 600 may be performed by any suitable system, such as a cryptography service or a suitable component thereof, such as a security module in concert with a web server. In an embodiment, the process 600 includes the cryptography service receiving 602 (e.g., at a web server) a request to decrypt data, the request including an encrypted data key, encrypted data, and additional authenticated data that includes at least a nonce. The encrypted data is capable of being decrypted by the unencrypted data key, and may, for example, have been encrypted using the process described above in FIG. 5. In some embodiments, the encrypted data may be a part of a stream cipher that is transmitting large amounts of data (e.g., hundreds of gigabytes) in multiple blocks. The data may be transmitted in several blocks for several reasons, for example, based on performance, security, and/or cost. In some embodiments, the request may also include other information that may be used in the decrypt process, such as an initialization vector that may be operable in the decrypting of a stream cipher.

The cryptography service (e.g., a security module of the cryptography service) may perform a check 604 to determine whether to use the provided nonce in decrypting the encrypted message. In an embodiment, the authorization check may be performed in the decryption operation, where the component performing the decryption operation (e.g., the authenticated encryption module 104) may check that the nonce in the AAD matches the nonce used to encrypt the encrypted data key.

The cryptography service, upon detecting 606 the authorization check passed, may decrypt the encrypted data key. The decrypting of the encrypted data key may, for example, require the nonce provided in the additional authenticated data. In some embodiments, different components may be used to perform 604 the authorization check and 606 decrypt the encrypted data key. In some embodiments, the decryption of the encrypted data key may be done in accordance with the decryption of the encrypted data key described in the process described in FIG. 5.

The cryptography service may receive 608 the encrypted data key and decrypt the encrypted data using at least the unencrypted data key and the provided nonce. For example, the unencrypted data key (plaintext data key) and nonce may be used as inputs into a decryption algorithm to decrypt the encrypted data. Finally, the cryptography service may provide 610 the decrypted data to the client. In some embodiments, an API call may return with the decrypted data, a reference to the decrypted data, and/or metadata describing where the client may obtain the decrypted data.

Figure 7:
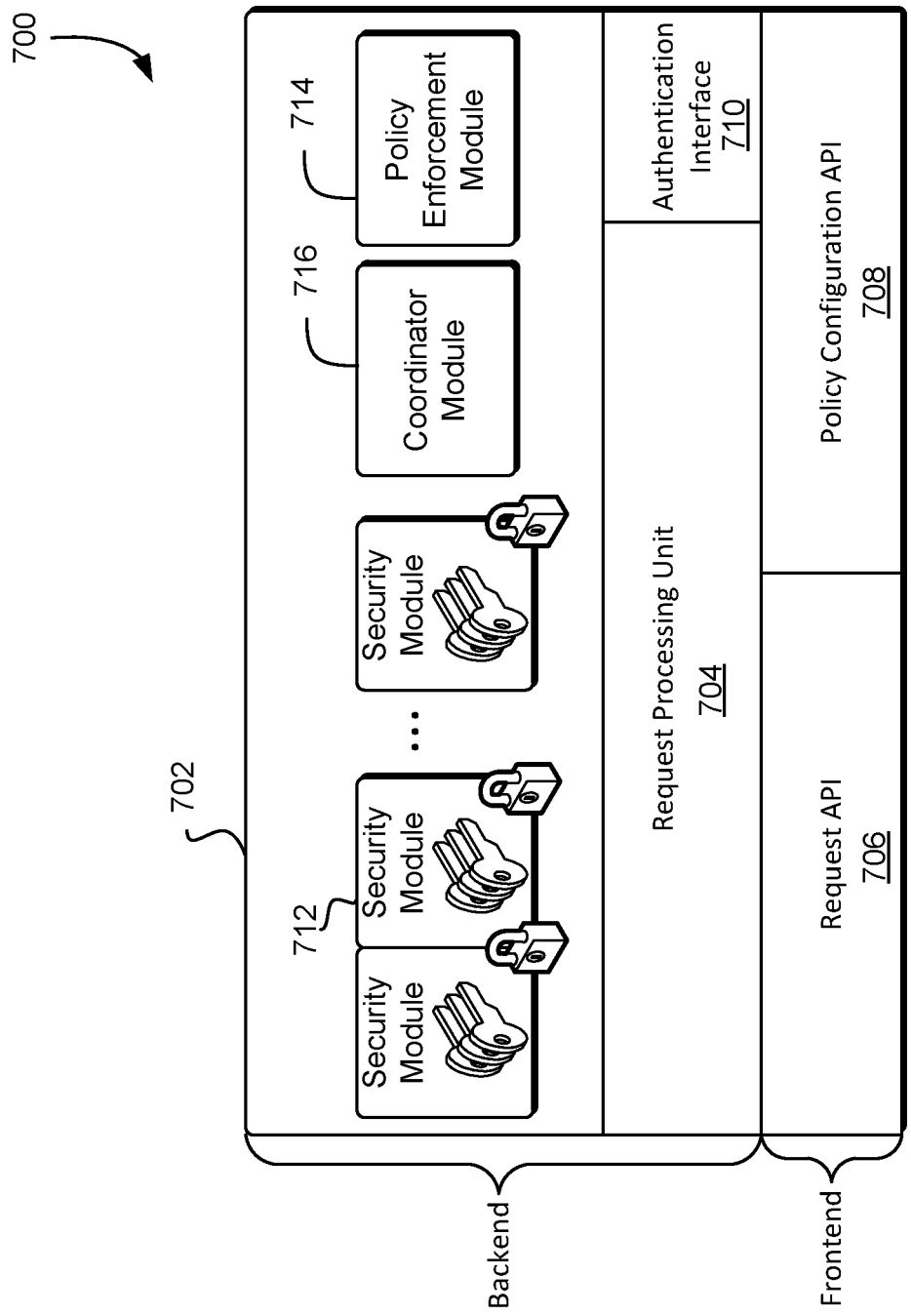
FIG. 7 shows an illustrative example of a cryptography service in accordance with an embodiment.

As discussed above, various embodiments of the present disclosure are directed to providing cryptography services. Cryptography services may be provided by a cryptography service system such as described above. FIG. 7 accordingly shows an illustrative example of a cryptography service 700 in accordance with various embodiments. As illustrated in FIG. 7 and as discussed above, the cryptography service 700 is logically comprised of a frontend system and a backend system 702. Both the frontend system and the backend system may be implemented by one or more computer systems configured to perform operations described herein. For example, as illustrated in FIG. 7, the frontend system of the cryptography service 700 implements a request API 706 and a policy configuration API 708. The request API, in an embodiment, is an API configured for requesting cryptographic and other operations to be performed by the cryptography service. Thus, requests may be made to the frontend system via the request API in order for such cryptographic operations to be performed by the cryptography service.

The request API may be configured with the following example, high-level, requests available:
CreateKey(KeyID)
Encrypt(KeyID, Data, AAD)
Decrypt(KeyID, Ciphertext, AAD)

A CreateKey(KeyID) request, in an embodiment, causes the cryptography service to create a key identified by the KeyID identified in the request. Upon receipt of a request, the cryptography service may generate a key and associate the key with the KeyID. It should be known that KeyID's may be, but are not necessarily unique identifiers. For instance, a KeyID may identify a family of keys. For example, in some embodiments, key rotation is performed. Key rotation may involve replacing keys with other keys to prevent collection of enough decrypted data to allow practical cracking of a cipher used. If performed at the direction of an entity different from the cryptography service, use of the CreateKey(KeyID) request may cause the cryptography service to create a new key to replace an old key identified by the KeyID. The old key may remain identified by the KeyID, but may, for instance, be only used for decryption (of data that has already been encrypted using the old key) and not for future encryption. As another example, in some embodiments, users of the cryptography service provide their own key identifiers and there is a possibility that two different customers may provide the same identifier. In such instances, the identifier may not uniquely identify a key or even uniquely identify a family of keys. Various measures may be in place to address this. For example, an identity or other information associated with a user of the cryptography service may be used to identify the proper key or family of keys. In still other embodiments the cryptographic service may assign a KeyID randomly, sequentially, or using any other method.

It should be noted that, when a KeyID does not uniquely identify a key, various systems may be in place to enable proper functionality. For example, in various embodiments, a family of keys identified by a KeyID is finite. If a decryption operation using a key identified by a KeyID is requested, additional data (e.g., a time stamp of when the encryption was performed) may enable determining the proper key to use. In some embodiments, ciphertexts may include information indicating a key version. In some embodiments, all possible keys are used to provide different decryptions of the data. Since there are a finite number of keys, the proper decryption may be selected from those provided. In some embodiments, decryption with a key is performed in a manner that enables the cryptographic service to detect that the ciphertext was not generated based at least in part on the key, such as by using authenticated encryption. Other variations are also considered as being within the scope of the present disclosure.

An Encrypt(KeyID, Data, AAD) request may be used to cause the cryptography service to encrypt the specified data using a key identified by the KeyID. Additional Authenticated Data (AAD) may be used for various purposes and may be data that is not necessarily encrypted, but that is authenticated, e.g., by an electronic signature, a message authentication code or, generally, a keyed hash value included with the AAD. In some embodiments, the ciphertext is generated including at least a portion of the AAD. In some other embodiments the AAD is provided separately during decryption. In some other embodiments, the AAD is generated at decryption time based at least in part on the request and or other metadata such that decryption will only succeed when the metadata passes. In some embodiments, policy may constrain whether a cryptographic operation can be performed with respect to particular AAD. Processing of Encrypt(KeyID, Data, AAD) requests may require, by programming logic and/or policy enforced by the cryptography service, both that the AAD contain particular values and that the AAD be authentic (e.g., not modified since original transmission). Similarly, a Decrypt(KeyID, Ciphertext, AAD) request may be used to cause the cryptography service to decrypt the specified ciphertext using a key identified by the KeyID. The AAD in the Decrypt(KeyID, Ciphertext, AAD) request may be used such as described above. For instance, processing of the Decrypt(KeyID, Ciphertext, AAD) may require, by programming logic and/or policy enforced by the cryptography service, both that the AAD contain particular values and that the AAD be authentic (e.g., not modified since original transmission).

Similarly, the frontend system may implement a policy configuration API which, in an embodiment, enables users to submit requests for configuring policies for the performance of cryptographic operations and for other policy-related operations. Policies may be associated with keys, groups of keys, accounts, users and other logical entities in various embodiments. Example policies, which may be configured via the policy configuration API, are provided below. In an embodiment, the cryptographic service policy configuration API includes the following requests:

SetKeyPolicy(KeyID, Policy)
  Suspend(KeyID, Public Key)
  Reinstate(KeyID, Private Key)

In an embodiment, the SetKeyPolicy(KeyID, Policy) request may be used to cause the cryptographic service to store a policy on the key (or family of keys) identified by the KeyID. A policy may be information that is determinative of whether a requested cryptographic operation can be performed in a particular context. The policy may be encoded in a declarative access control policy language, such as eXtensible Access Control Markup Language (XACML), Enterprise Privacy Authorization Language (EPAL), Amazon Web Services Access Policy Language, Microsoft SecPol or any suitable way of encoding one or more conditions that must be satisfied for a cryptographic operation to be performed. Policies may define what operations can be performed, when the operations can be performed, which entities can make authorized requests for operations to be performed, which information is required for a particular request to be authorized, and the like. In addition, policies may be defined and/or enforced using access control lists, privileges associated with users, and/or operation bitmasks in addition to or instead of the examples given above. Example policies appear below.

In some embodiments the cryptographic service may support a suspend operation, e.g., using a Suspend(KeyID, Public Key) API call. A suspend operation enables the customer of the cryptographic service to deny the operator of the cryptographic service use of or access to a key. This can be useful to customers concerned about covert lawful orders or other circumstances in which the operator of the cryptographic service might be compelled to perform some operation using a key. It may also be useful to customers that wish to lock particular data and render it inaccessible online. In some embodiments, a suspend operation might include receiving a public key from a customer and encrypting the key specified by a given KeyID with the received public key and shredding the key specified by the KeyID, such that the provider is not able to access the suspended key unless the private key associated with the public key is provided, e.g., using a Reinstate(KeyID, Private Key) API call that both specifies the KeyID and includes the private key. In some other embodiments, a suspend operation might involve encrypting a key associated with a specified KeyID using another key managed by the cryptographic service, including without limitation one created for the purpose of the instant suspend operation. The ciphertext produced by this operation can be provided to the customer and not retained within the cryptographic service. The original key identified by the KeyID can then be shredded. The cryptographic service may be operable to receive the provided ciphertext and re-import the suspended key. In some embodiments the ciphertext may be generated in a manner that will prevent the cryptographic service from returning a decrypted version to the customer.

The backend system of the cryptography service 700 also, in this illustrative example, includes a plurality of a security modules 712 (cryptography modules), a policy enforcement module 714, and a coordinator module 716. One or more of the security modules may be hardware security modules although, in various embodiments, a security module may be any suitable computer device configured according to have capabilities described herein. Each security module in an embodiment stores a plurality of keys associated with KeyIDs. Each security module may be configured to securely store the keys so as to not be accessible by other components of the cryptography service 700 and/or other components of other systems. In an embodiment, some or all of the security modules are compliant with at least one security standard. For example, in some embodiments, the security modules are each validated as compliant with a Federal Information Processing Standard (FIPS) outlined in FIPS Publication 140-1 and/or 140-2, such as one or more security levels outlined in FIPS Publication 140-2. In addition, in some embodiments, each security module is certified under the Cryptographic Module Validation Program (CMVP). A security module may be implemented as a hardware security module (HSM) or another security module having some or all capabilities of an HSM. In some embodiments, a validated module is used to bootstrap operations. In some embodiments, customers can configure some keys that are stored in and operated on only by validated modules and other keys that are operated on by software. In some embodiments, the performance or cost associated with these various options may differ.

The security modules may be configured to perform cryptographic operations in accordance with instructions provided by the request processing unit 704. For example, the request processing unit may provide ciphertext and a KeyID to an appropriate security module with instructions to the security module to use a key associated with the KeyID to decrypt the ciphertext and provide in response the plaintext. In an embodiment, the backend system of the cryptography service 700 securely stores a plurality of keys forming a key space. Each of the security modules may store all keys in the key space; however, variations are considered as being within the scope of the present disclosure. For example, each of the security modules may store a subspace of the key space. Subspaces of the key space stored by security modules may overlap so that the keys are redundantly stored throughout the security modules. In some embodiments, certain keys may be stored only in specified geographic regions. In some embodiments, certain keys may be accessible only to operators having a particular certification or clearance level. In some embodiments certain keys may be stored in and used only with a module operated by a particular third party provider under contract with the provider of data storage services. In some embodiments, constructive control of security modules may require that lawful orders seeking to compel use of keys other than as authorized by the customer to involve either additional entities being compelled or additional jurisdictions compelling action. In some embodiments, customers may be offered independent options for the jurisdiction in which their ciphertexts are stored and their keys are stored. In some embodiments, security modules storing keys may be configured to provide audit information to the owner of the keys, and the security modules may be configured such that the generation and providing of audit information not suppressible by the customer. In some embodiments, the security modules may be configured to independently validate a signature generated by the customer such that the provider (e.g., hosting the security modules) is not able to perform operations under keys stored by the security modules. In addition, some security models may store all of the key space and some security modules may store subspaces of the key space. Other variations are also considered as being the scope of the present disclosure. In instances where different security modules store different subspaces of the key space, the request processing unit may be configured such as with a relational table or other mechanism to determine which security module to instruct to perform cryptographic operations in accordance with various requests. As illustrated in FIG. 7, backend system 702 comprises an authentication interface 710, in at least one embodiment.

In an embodiment, the policy enforcement module is configured to obtain information from a request processing unit and determine, based at least in part on that information, whether the request received through the API may be performed. For example, when a request to perform cryptographic operation is received through the request API, the request processing unit may interact with the policy enforcement module to determine whether fulfillment of the request is authorized according to any applicable policy such as policy applicable to a specified KeyID in the request and/or other policies such as policy associated with the requestor. If the policy enforcement module allows fulfillment of the request, the request processing unit may, accordingly, instruct an appropriate security module to perform cryptographic operations in accordance with fulfilling the request.

As with all figures described herein, numerous variations are considered as being within the scope of the present disclosure. For example, FIG. 7 shows the policy enforcement module separate from security modules. However, each security module may include a policy enforcement module in addition to or instead of the policy enforcement module illustrated as separate. Thus, each security module may be independently configured to enforce policy. In addition, as another example, each security module may include a policy enforcement module which enforces policies different from policies enforced by a separate policy enforcement module. Numerous other variations are considered as being within the scope of the present disclosure.

Numerous variations of the processes described herein are considered as being within the scope of the present disclosure. For example, flowcharts shown in the figures show an example order of operations. Unless otherwise clear from context (e.g., because one operation depends on the performance of another operation), operations may be performed in a different order than illustrated. Similarly, processes may be modified in accordance with various embodiments to utilize fewer operations or a greater number of operations. Note also that, while the techniques described above are described in connection with a cryptography service, the same techniques may be adapted to other contexts, such as any context where data is passed from one entity to another for the purpose of performing cryptographic operations. Such entities may be different computer systems separated by a network or may, may be different applications executing on the same computer system, or different modules of the same application. Other variations are also considered as being within the scope of the present disclosure.

Embodiments of the present disclosure utilize communications protocols that utilize symmetric and/or asymmetric cryptographic primitives (algorithms). Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2, and Bcrypt. Asymmetric key algorithms may also include various schemes for performing cryptographic operations on data. Example algorithms include those that utilize the Diffie-Hellman key exchange protocol (an example cryptographic key exchange process), the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes including eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman+CTR (CWC) mode, Counter with CBC-MAC (CCM) mode, Galois/Counter (GCM) mode, message authenticate code based on universal hashing (UMAC), and Poly1305-AES.

The techniques of the present disclosure may include the addition of and/or modification of messages generated in accordance with one or more cryptographic primitives, such as described above, such that the additional/modified messages include information replacing the output of one or more cryptographic primitives where the information is not valid output of one of the cryptographic primitives. Information may be invalid as output of a cryptographic primitive, for example, the information differs from the output that was generated by correct performance of the cryptographic primitive. The information may differ by value, format, and/or size. Example information may replace a fingerprint, checksum, encrypted message, certificate, and other output of one or more cryptographic primitives, such as described above.

Further, while the techniques described above are, for the purpose of illustration, focused on network communications, the techniques may be adapted to other contexts. For instance, insecurity may be injected into other types of communications, such as communications between processes of a computer system. Such techniques may be used, for example, to enable one application to test the operation of another application with respect to its response to insecurity injected into communications. Generally, communication channels do not necessarily require a network. Further, with respect to network communications, a network may be at least partially a virtual network and, in some examples, a communication may traverse a network without leaving a hardware computing device (e.g., when a communication is between two virtual computer systems implemented by the same hardware device). In addition, while network communications protocols (e.g., TLS) are used for the purpose of illustration, the techniques of the present disclosure may be used in connection with other protocols, such as protocols for utilizing an application programming interface (API) and, generally, any set of specifications for communications.

Figure 8:
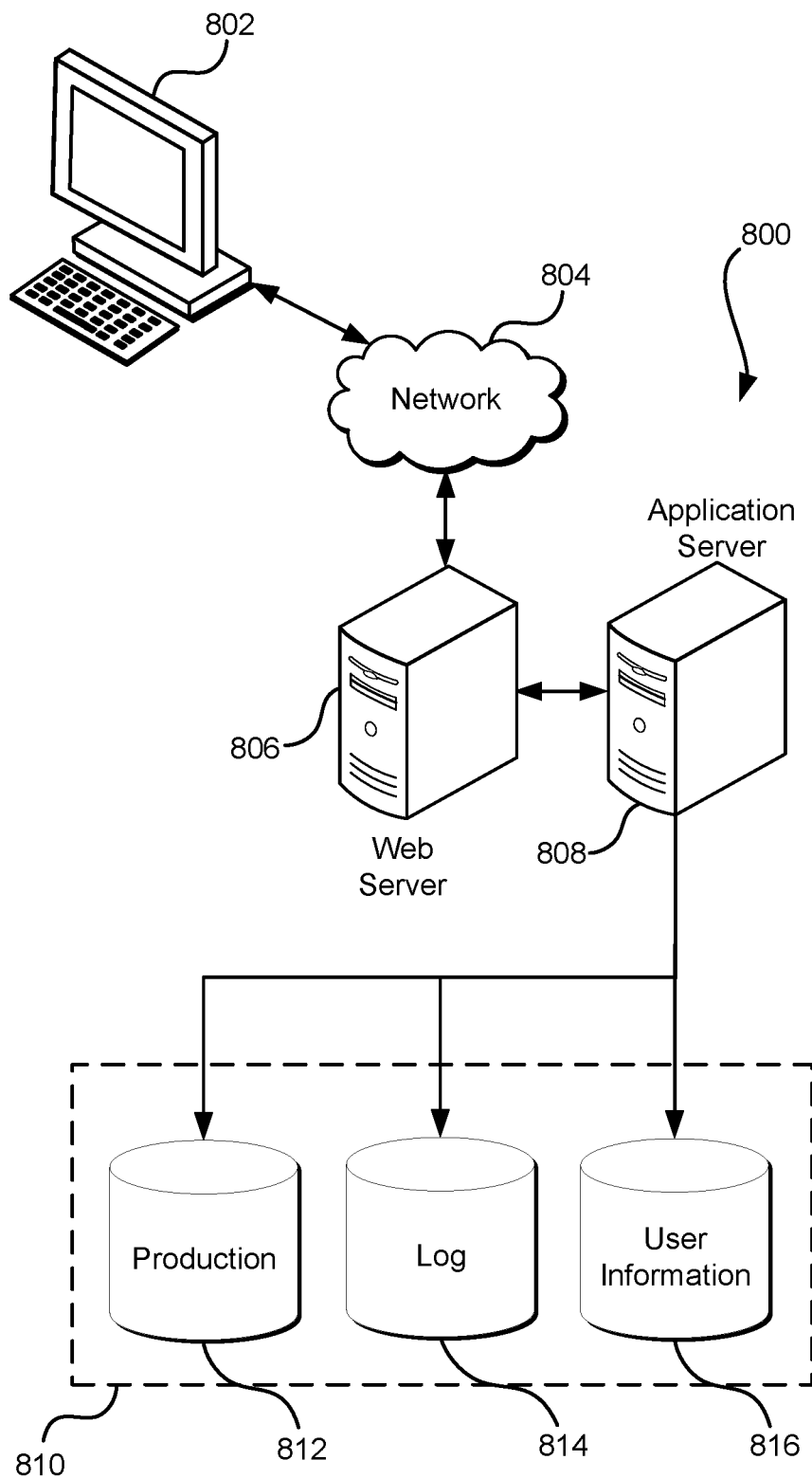
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    at a first computing entity:
        obtaining, from a web service application programming interface request from a second computing entity, an encrypted first key, a nonce generated by the second computing entity, and an authentication tag, wherein the authentication tag is derived using a keyed hash function based at least in part on the first key as a secret of the keyed hash function and a message that comprises the encrypted first key and the nonce;
        authenticating the nonce based at least in part on the authentication tag; and
        contingent upon successfully verifying authenticity of the nonce, decrypting the encrypted first key using a second key and the nonce.

2. The computer-implemented method of claim 1, wherein the authentication tag is a first authentication tag and authenticating the nonce comprises:
    computing a second authentication tag, where the computing of the second authentication tag is based at least in part on the encrypted first key and the nonce;
    comparing the first authentication tag and the second authentication tag; and
    detecting the first authentication tag and the second authentication tag match.

3. The computer-implemented method of claim 1, further comprising:
    at the first computing entity:
        decrypting an encrypted data using the first key and the nonce, thereby generating plaintext data; and
        providing the plaintext data to the second computing entity.

4. The computer-implemented method of claim 1, wherein the message comprises the first key in an encrypted format and the nonce.

5. A system, comprising one or more non-transitory machine-readable mediums storing a set of instructions, which if performed by one or more processors, cause the system to at least:
    obtain, through a web service application programming interface request from an entity, an encrypted first key, a nonce generated by the entity, and an authentication tag, wherein the first key is used by a keyed hash function to generate the authentication tag from an input comprising the encrypted first key and the nonce;
    determine the nonce is authentic based at least the authentication tag; and
    decrypt, as a result of authentication of the nonce, the encrypted first key by at least using a second key and the nonce.

6. The system of claim 5, wherein the set of instructions to determine that the nonce is authentic further include instructions that, as a result of execution by the one or more processors, cause the system to compare the authentication tag to a second authentication tag computed based at least in part on the encrypted first key and the nonce.

7. The system of claim 5, wherein the set of instructions include instructions that, as a result of execution by the one or more processors, cause the system to provide the decrypted first key and the nonce for input into a decryption algorithm to decrypt encrypted data in response to determining the nonce is authentic.

8. The system of claim 5, wherein the set of instructions to decrypt the encrypted first key by at least using the second key and the nonce include instructions that, as a result of execution by the one or more processors, cause the system to initialize an initialization vector using the nonce.

9. The system of claim 5, wherein the set of instructions include instructions that, as a result of execution by the one or more processors, cause the system to decrypt the encrypted first key using an authenticated encryption mode of a cryptographic algorithm, wherein the authenticated encryption mode is in accordance with a block cipher mode of operation.

10. The system of claim 9, wherein the block cipher mode of operation is Galois/Counter (GCM) mode.

11. The system of claim 5, wherein the encrypted first key, the authentication tag, and the nonce are obtained in a request obtained from a requestor over a network.

12. The system of claim 5, wherein the set of instructions include instructions that, as a result of execution by the one or more processors, cause the system to generate the nonce and the encrypted first key.

13. A non-transitory computer-readable storage medium storing thereon executable instructions that, as a result of execution by one or more processors of a computer system, cause the computer system to at least:
    obtain, from a web service application programming interface request from a different computer system, an encrypted first key, a nonce generated by the different computer system, and an authentication tag, wherein the first key is used in a keyed hash function to generate the authentication tag from a message comprising the encrypted first key and the nonce;
    determine the nonce is authentic based at least the authentication tag; and
    based at least in part on determining the nonce is authentic, decrypt the encrypted first key by at least using a second key and the nonce.

14. The non-transitory computer-readable storage medium of claim 13, further comprising instructions that, as a result of execution by the one or more processors, cause the computer system to:
    compute a second authentication tag, where the computing of the second authentication tag is based at least in part on the encrypted first key and the nonce;
    compare the authentication tag and the second authentication tag;
    detect the authentication tag and the second authentication tag match; and
    make the decrypted first key and the nonce available for use in response to determining the authentication tag and the second authentication tag match.

15. The non-transitory computer-readable storage medium of claim 13, further comprising instructions that, as a result of execution by the one or more processors, cause the computer system to provide the decrypted first key and the nonce for input into a decryption algorithm to decrypt data.

16. The non-transitory computer-readable storage medium of claim 13, wherein the authentication tag is derived based at least in part on the encrypted first key, the nonce, and additional authenticated data.

17. The non-transitory computer-readable storage medium of claim 13, wherein the authentication tag is a hash-based message authentication code.

18. The non-transitory computer-readable storage medium of claim 13, further comprising instructions that, as a result of execution by the one or more processors, cause the computer system to:
   obtain a second request to decrypt the encrypted first key;
   verify authenticity of the nonce; and
   provide the decrypted first key in response to the second request as a result of the authenticity of the nonce being verified.

19. The non-transitory computer-readable storage medium of claim 13, wherein the authentication tag is derived further based at least in part on a ciphertext.

20. The non-transitory computer-readable storage medium of claim 13, further comprising instructions that, as a result of execution by the one or more processors, cause the computer system to cryptographically hash the encrypted first key and the nonce, thereby deriving the authentication tag.

* * * * *